(12) United States Patent
Wager et al.

(10) Patent No.: US 9,279,230 B2
(45) Date of Patent: Mar. 8, 2016

(54) IMPLEMENT WITH A BOOM

(71) Applicant: Liebherr-Hydraulikbagger GmbH, Kirchdorf/Iller (DE)

(72) Inventors: Bernd Wager, Kirchdorf (DE); Stefan Schott, Memmingen (DE)

(73) Assignee: Liebherr-Hydraulikbagger GmbH, Kirchdorf/Iller (DE)

( * ) Notice: Subject to any disclaimer, the term of this patent is extended or adjusted under 35 U.S.C. 154(b) by 505 days.

(21) Appl. No.: 13/672,771

(22) Filed: Nov. 9, 2012

(65) Prior Publication Data

US 2013/0142606 A1 Jun. 6, 2013

(30) Foreign Application Priority Data

Dec. 1, 2011 (DE) .......................... 10 2011 119 940
Feb. 2, 2012 (DE) .......................... 10 2012 002 041

(51) Int. Cl.
*E02F 3/36* (2006.01)
*E02F 9/00* (2006.01)
*F16C 11/02* (2006.01)
*F16C 11/04* (2006.01)

(52) U.S. Cl.
CPC ............... *E02F 3/3695* (2013.01); *E02F 9/006* (2013.01); *F16C 11/02* (2013.01); *F16C 11/045* (2013.01)

(58) Field of Classification Search
CPC ........ E02F 3/3695; E02F 9/006; F16C 11/02; F16C 11/045
USPC ......................................... 414/686, 722, 723
See application file for complete search history.

(56) References Cited

U.S. PATENT DOCUMENTS

| 5,320,443 A | * | 6/1994 | Lien et al. | ...................... 403/154 |
| 5,993,139 A | * | 11/1999 | Deneve et al. | ................. 414/722 |
| 6,609,587 B1 | * | 8/2003 | Smith et al. | ................... 180/418 |
| 6,877,259 B2 | * | 4/2005 | Nishimura et al. | ............. 37/468 |

* cited by examiner

*Primary Examiner* — Dean Kramer
(74) *Attorney, Agent, or Firm* — Alleman Hall McCoy Russell & Tuttle LLP

(57) ABSTRACT

The present disclosure relates to an implement with a boom, wherein the boom is pivotally mounted about a horizontal axis via a bolt connection on a basic unit of the implement, with the bearing of the boom on the basic unit being effected via three bearing plates with corresponding bearing points for the bolt connection.

13 Claims, 4 Drawing Sheets

IMPLEMENT WITH A BOOM

CROSS REFERENCE TO RELATED APPLICATIONS

This application claims priority to German Patent Application No. 10 2011 119 940.7, entitled "Implement with a Boom," filed Dec. 1, 2011, and to German Patent Application No. 10 2012 002 041.4, entitled "Implement with a Boom," filed Feb. 2, 2012, which are hereby incorporated by reference in their entirety for all purposes.

TECHNICAL FIELD

The present disclosure relates to an implement with a boom, wherein the boom is pivotally mounted about a horizontal axis via a bolt connection on a basic unit of the implement. In particular, the boom can be pivotally attached to the turntable of a traveling implement about a horizontal axis via the bolt connection and be pivotable via at least one hydraulic cylinder. In particular, the implement can be a hydraulic excavator with a hydraulically pivotable boom.

BACKGROUND AND SUMMARY

For articulating the boom to the turntable, the two solutions shown in FIGS. 1 and 2 are known. FIG. 1 shows a double-shear bearing of the boom 1 on the turntable 2. For this purpose, two bearing plates 3 with corresponding bearing points 4 for the bolts 5 are provided on the turntable 2. The bolt 5 connects the bearing points 4 on the bearing plates 3 with the bearing tube 7 on the boom 1 which here is shown as monoblock boom 6.

This design has the advantage that the boom fabricated as a closed box is extremely torsion-resistant. When the system is designed for greater loads, the double-shear bearing however leads to a number of disadvantages, such as for example to a long, heavy and hence hardly handleable bolt, to an increasing deflection of the bolt, and to a high bearing stress.

Furthermore, the four-shear bearing shown in FIG. 2 is known, in which two parallel bearing plates 3 each are provided to the left and to the right on the turntable 2, which each include bearing points 4 for one of the two bolts 5. The boom foot of the boom 1 is bifurcated far apart for articulation and includes two bearing sleeves 7 which via the bolts 5 are connected with the respective bearing points on the left and right bearing plates, respectively. This leads to the fact that short, lightweight and correspondingly easily handleable bolts can be used, which in addition have a low bolt deflection. Furthermore, the bearing stress is correspondingly lower. What is, however, disadvantageous in this solution is the lower torsional stiffness of the monoblock foot 6 due to the design being bifurcated far apart.

Despite the disadvantages of the respective solutions known for decades, an articulation which combines the advantages of the two articulations and avoids their respective disadvantages has not been found so far.

It is the object of the present disclosure to provide an improved articulation of a boom on the basic unit of the implement.

In accordance with the present disclosure, this object is solved by an implement comprising a boom which is pivotally mounted about a horizontal axis via a bolt connection on a basic unit of the implement. According to the present disclosure, the boom now is mounted on the basic unit via three bearing plates with corresponding bearing points for the bolt connection. Such three-shear bearing via three main webs combines the advantages of the double-shear and the four-shear bearing, without having its disadvantages.

Thus, after decades of stagnation in the field of the articulation of booms, the present disclosure for the first time provides a fundamentally improved new conception of such an articulation.

Advantageously, the bolt connection is effected via at least two bolt elements. This provides for using short and correspondingly lightweight bolts, which correspondingly are easily handleable and have a low bolt deflection.

Advantageously, the bolt connection is designed such that the at least two bolt elements each are inserted from the outside to the inside. In particular, the two bolts are put through the respective bearing points of the two outer bearing plates from outside and are secured at the two outer bearing plates.

When two bolt elements are used for the bolt connection, the same advantageously support on the middle bearing plate with their inner ends. The middle bearing plate therefore advantageously includes a correspondingly dimensioned bearing point. Advantageously, the bearing point on the middle bearing plate is prolonged on both sides beyond the thickness of the bearing plate.

Alternatively, the bolt connection also can be effected via three bolt elements, with the middle bolt element supporting on the middle bearing plate. Here as well, the bearing point on the middle bearing plate therefore advantageously is dimensioned correspondingly and furthermore advantageously is prolonged on both sides beyond the thickness of the middle bearing plate.

The middle bolt element can floatingly be mounted on the middle bearing plate and in turn solely be secured via the outer bolt elements, which are secured on the outer bearing plates. Alternatively, however, securing the middle bolt element on the middle bearing plate also is conceivable.

In the present disclosure, the bolt elements furthermore can be connectable with each other via plug connections. This provides for a positive connection of the bolt elements with each other. In particular, this allows a centering and/or support of the individual bolt elements on each other.

Advantageously, adjacent end faces of the bolt elements include a corresponding protrusion or a corresponding cutout, so that the protrusion on the one end face can be pushed into a cutout on the other end face.

Particularly preferably, such plug connections are employed when using three bolt elements, so that the middle bolt element is connectable with the two outer bolt elements via the plug connections.

According to the present disclosure, a bearing point furthermore can be provided on the middle bearing plate for articulating an energy recovery cylinder. The middle bearing plate thus allows a particularly easily realizable articulation point for the energy recovery cylinder, which advantageously extends from this bearing point towards the boom. The bearing point for the energy recovery cylinder can be arranged below the bearing point for the articulation of the boom.

Furthermore, on the outer bearing plates there can each be arranged bearing points for the articulation of hydraulic cylinders for moving the boom. The same substantially can be designed as known from the prior art, for which purpose corresponding additional bearing plates advantageously are provided, in order to each provide for a double-shear articulation of the two hydraulic cylinders.

Advantageously, the three bearing plates of the implement according to the present disclosure extend upwards in vertical direction from a support structure of the basic unit. In particular, the three bearing plates can be aligned parallel to each other and/or extend in longitudinal direction of the implement. In particular, the articulation axis is vertical to the three bearing plates.

Furthermore, the bearing plates and a supporting frame of the basic unit can form a welded construction. In particular, the bearing plates each are steel parts which are welded to a supporting frame of the basic unit or form part of such supporting frame.

The boom foot of the implement according to the present disclosure likewise can be designed as a welded construction. In particular, this is a closed box construction in accordance with the present disclosure.

Like in a four-shear bearing, the boom foot advantageously includes two bearing bushings which are welded to the box construction and through which the bolts extend for connection with the three bearing plates. Other than in a four-shear construction, the two bearing bushings can however be arranged very close to each other, so that the monoblock foot is bifurcated only little and has a correspondingly higher stiffness.

Advantageously, the distance between the two bearing bushings on the boom is smaller than their respective length. This results in a correspondingly high stability of the boom.

This dimensioning also is reflected in the dimensioning of the bearing points of the three bearing plates. In particular, the free distance between the respective bearing point on one of the outer bearing plates and the bearing point on the middle bearing plate is greater than the width of the bearing point on the inner bearing plate.

The novel articulation of the boom according to the present disclosure particularly advantageously is employed in implements with an undercarriage, with a traveling gear and an uppercarriage arranged on the undercarriage about a vertical axis of rotation, wherein the boom is articulated to the uppercarriage. Furthermore, the boom can carry a working tool. It can also be provided that the boom is movable via hydraulic cylinders.

In particular, the implement according to the present disclosure can be a mobile implement, for example a construction, earth-moving and/or material-handling machine. In particular, the implement according to the present disclosure is a hydraulic excavator.

Beside the implement, which consists of basic unit and boom, the present disclosure furthermore comprises a basic unit for such implement. Such basic unit includes the three bearing plates according to the present disclosure.

Advantageously, the basic unit is constructed such as it has already been described above.

Furthermore, the present disclosure also comprises a boom for an implement according to the present disclosure. The boom includes two articulation bushings which can be articulated to a basic unit of an implement according to the present disclosure via the three-shear bearing according to the present disclosure.

The present disclosure will now be explained in detail with reference to exemplary embodiments and drawings.

BRIEF DESCRIPTION OF THE FIGURES

FIG. 4a) shows a second exemplary embodiment of a three-shear mount according to the present disclosure with three bolt elements.

FIG. 4b) shows a third exemplary embodiment of a three-shear bearing according to the present disclosure with three pluggable bolt elements. FIGS. 1-4 are shown to scale, although other relative dimensions may be used, if desired.

DETAILED DESCRIPTION

Figure 1:
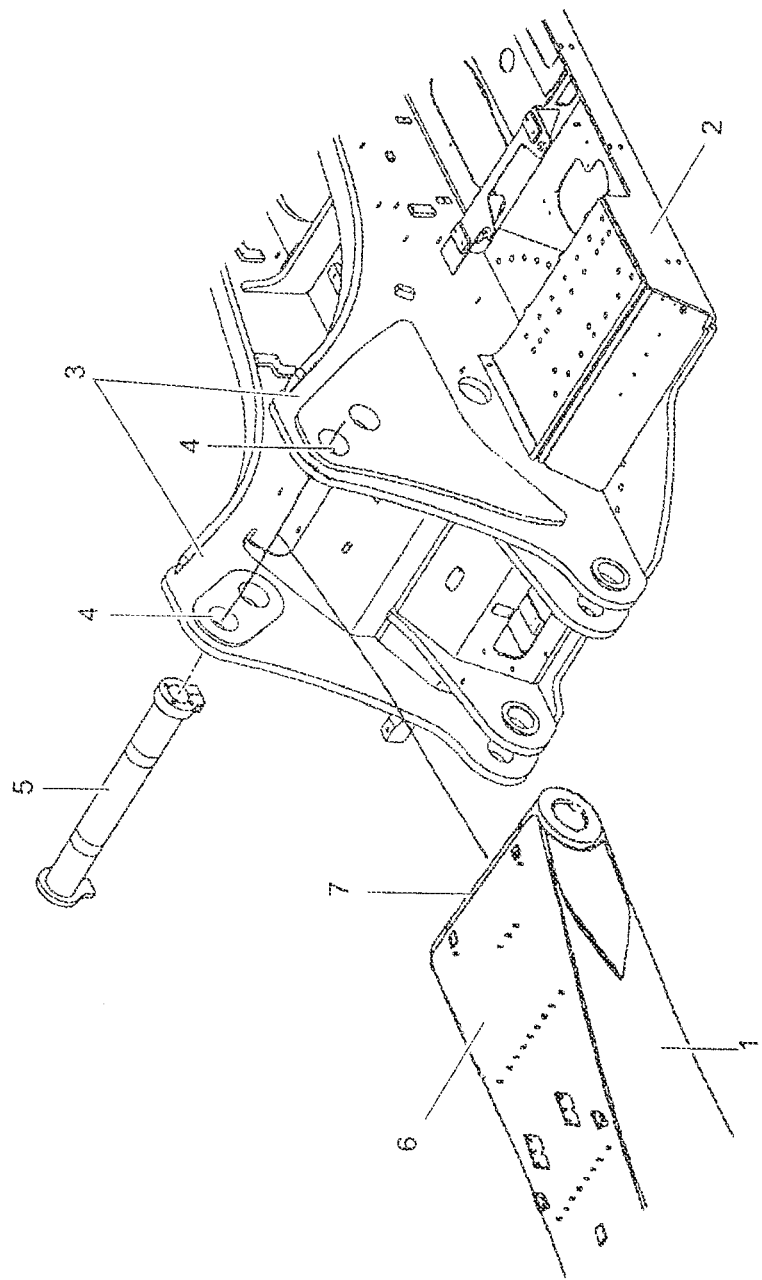
FIG. 1 shows a double-shear bearing according to the prior art.
Figure 2:
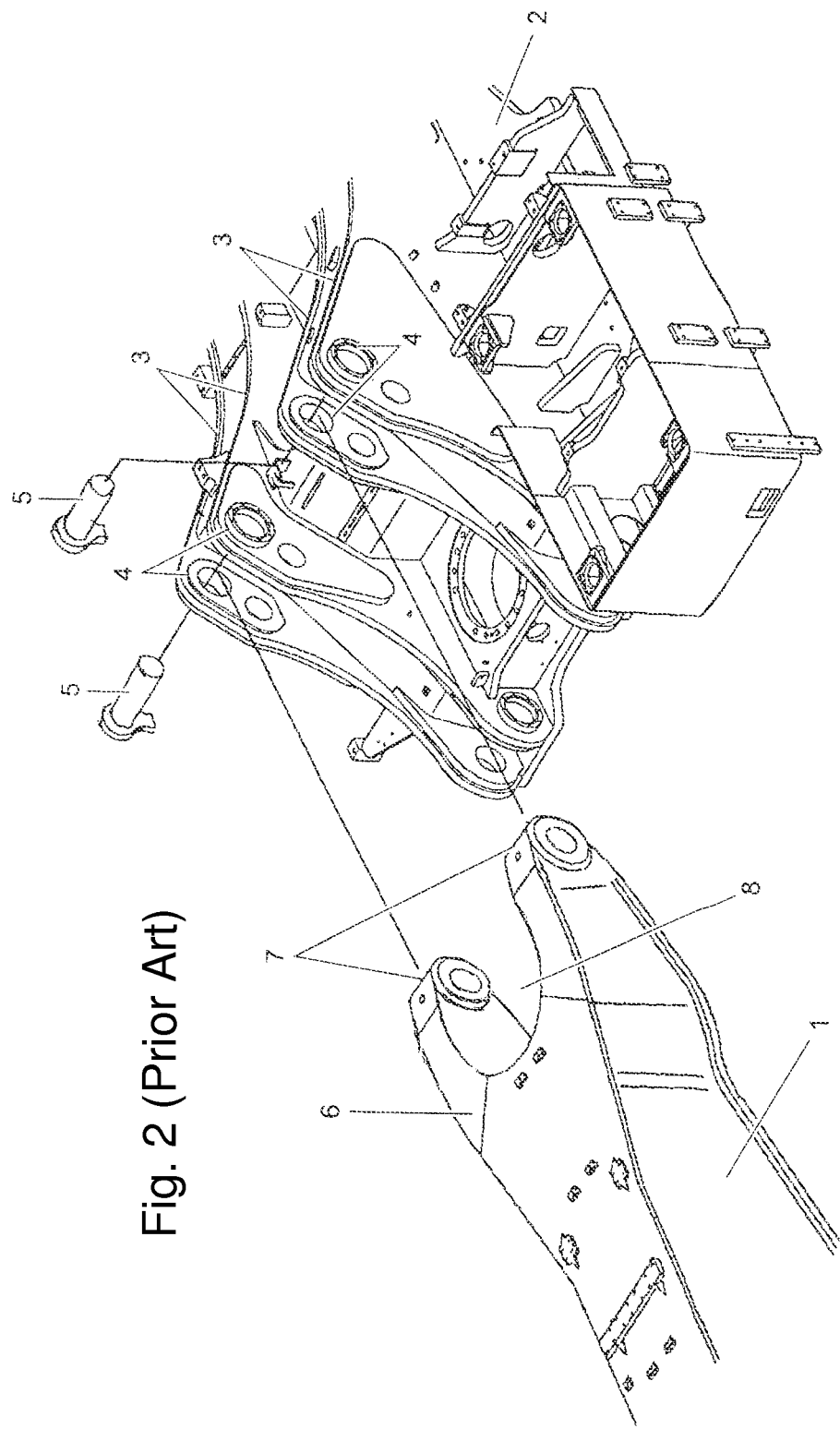
FIG. 2 shows a four-shear bearing according to the prior art.
Figure 3:
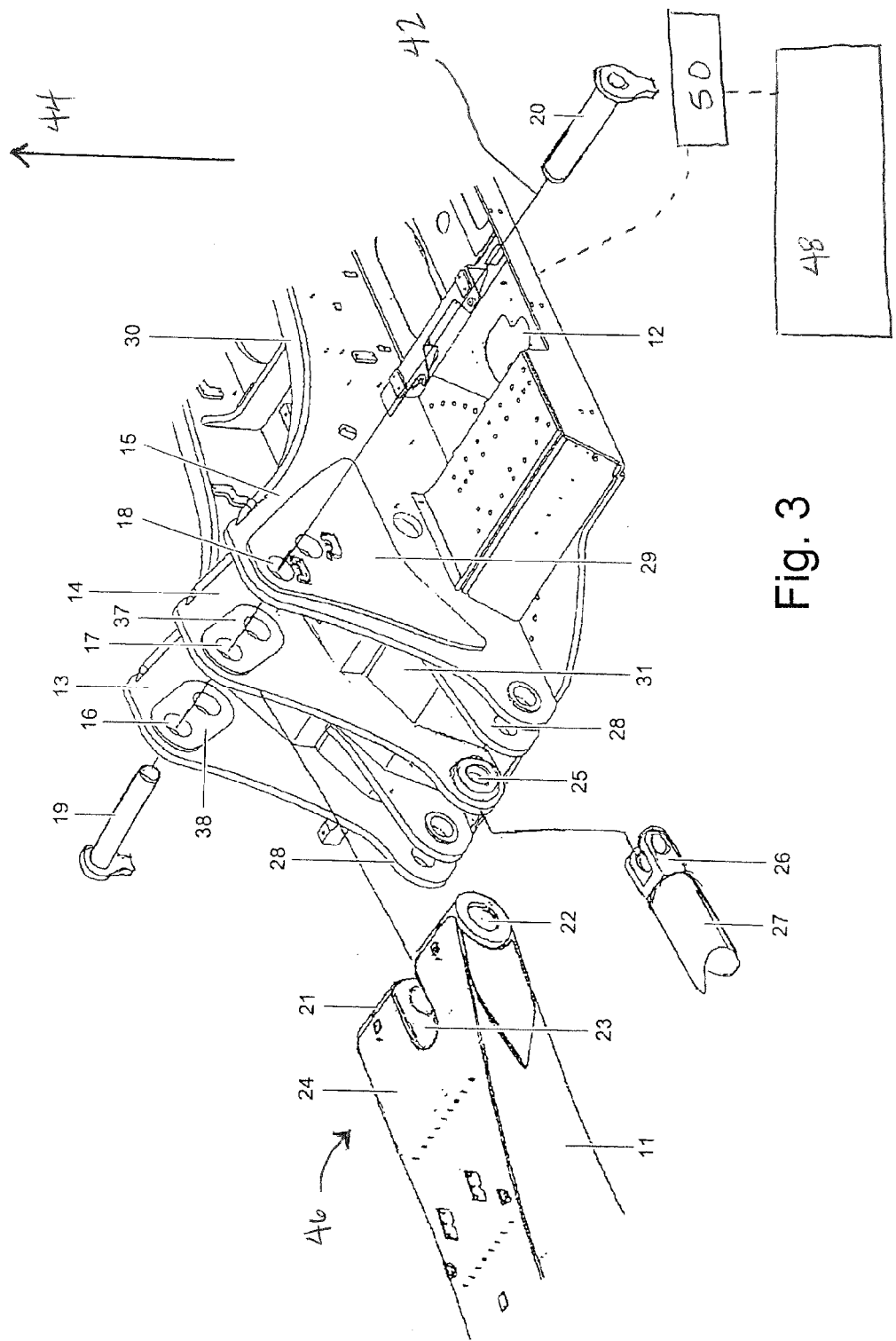
FIG. 3 shows a first exemplary embodiment of a three-shear bearing according to the present disclosure with two bolt elements.

An exemplary embodiment of an inventive three-shear articulation of a boom 11 to a basic unit, such as the turntable 12 of a mobile implement is shown in FIG. 3. The turntable 12 is rotatably arranged on an undercarriage 48, which carries the traveling gear of the mobile implement and an uppercarriage 50, about a vertical axis 44 via a rotary connection, which is not shown in further detail in FIG. 3.

On the turntable 12, three main webs in the form of bearing plates 13, 14 and 15 with corresponding bearing points 16, 17 and 18 are provided according to the present disclosure for supporting the boom 11. In the region of the bearing points, the bearing plates 13 to 15 can be reinforced by reinforcing plates on the inside and/or outside. Such reinforcing plate is designated as element 29 for the bearing plate 15 shown on the right in FIG. 3. Corresponding reinforcing plates 37 and 38 for the middle bearing plate 14 and the left bearing plate 13 are also shown. In one example, exactly three main webs are used.

As compared to a double-shear bearing, the boom is again supported by the middle support bearing 17. As a result, two bolts 19 and 20 can be used, which each are inserted from outside along horizontal axis 42. In the exemplary embodiment shown in FIG. 3, the two bolt elements 19 and 20 support on the bearing point 17 of the middle bearing plate 14 with their inner ends, and with their outer ends each are secured on the outer bearing plate 13 and 15, respectively.

The boom foot 46 of the boom 11 is designed as largely closed box construction 24, on which the two bearing bushings 21 and 22 are arranged. The cutout 23 between the two bearing bushings 21 and 22, which is necessary for accommodating the bearing plate 14, can be small according to the present disclosure. For example, the cutout can be only as large and wide as is necessary to accommodate the bearing plate 14. Due to this small bifurcation, the boom foot has a considerably higher stiffness than the boom foot bifurcated far apart of a four-shear bearing known from the prior art. Further, due to this configuration, the bearing plate 14 directly supports a bolt section, that bolt section directly interfacing with each of the bushings 21 and 22, whether two bolt sections are used as in FIG. 3, or whether three bolt sections are used as in FIGS. 4a-b.

Furthermore, the middle bearing plate 14 provides a simple possibility for supporting the articulation point 25 of an energy recovery cylinder 27 or other power actuator. The articulation point 25 can be arranged as bearing point on the articulation plate 14 and be comprised by a corresponding fork 26 on the energy recovery cylinder 27. The bearing point 25 can be arranged on the same axis as the bearing points 28 for the hydraulic cylinders for moving the boom, which are provided on the outer plates 13 and 15 and each are designed in double-shear form via further articulation plates.

According to the present disclosure, shorter and correspondingly lighter bolts can be used due to the three-shear bearing as compared to a double-shear bearing. In addition, the same have a lower bolt deflection under load. The assembly of the bolts also is facilitated considerably, since their weight is lower. Nevertheless, the lower stiffness of the boom as given with a four-shear bearing is avoided. In one example, exactly three shear bearings are used.

The bearing plates 13, 14 and 15 can be welded to a cross brace 31 of the turntable 12 and together with the same form a welded construction. The two outer bearing plates 13 and 15 advantageously reach up to behind the region of the slewing ring.

The three bearing plates used according to the present disclosure extend parallel to each other in vertical planes. In particular, the three bearing plates can have the same shape.

Figure 4:
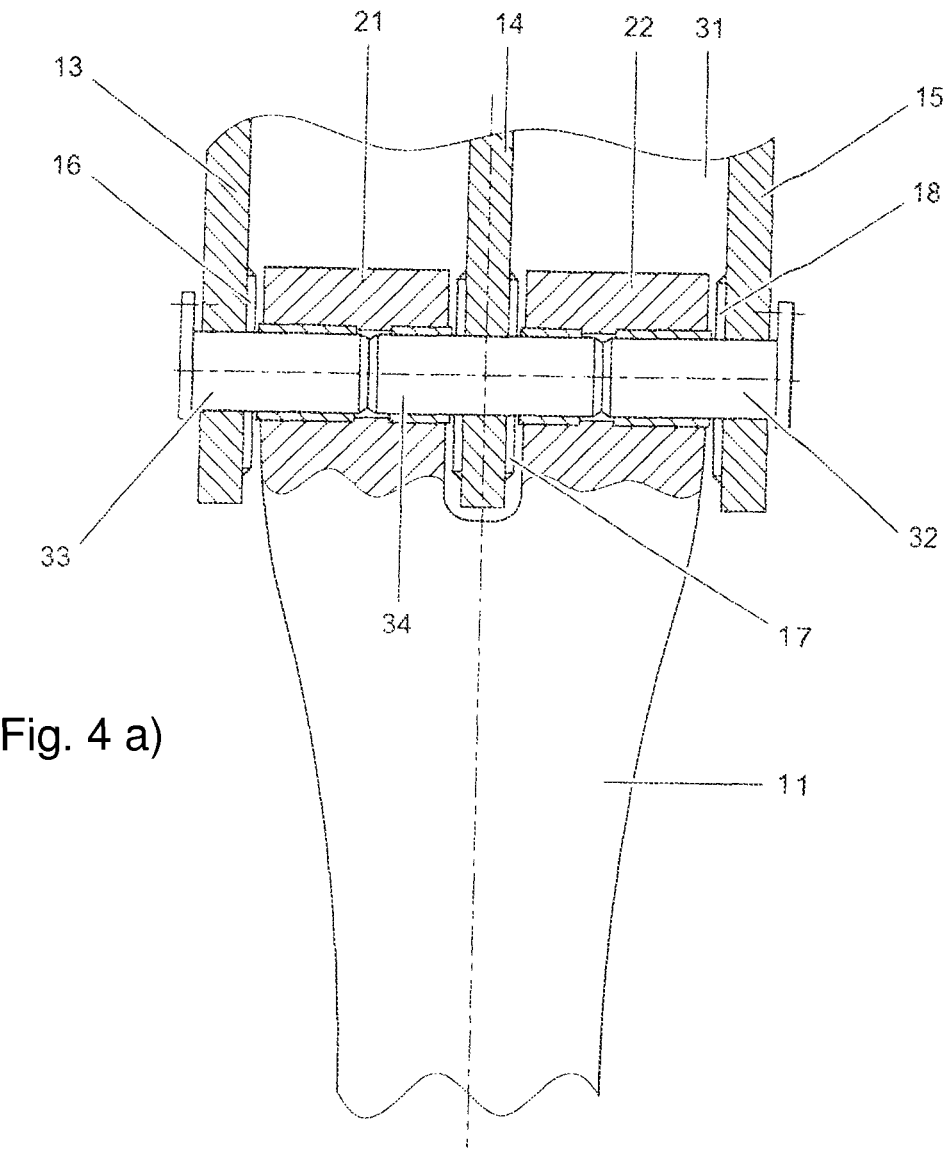
Figure 4:
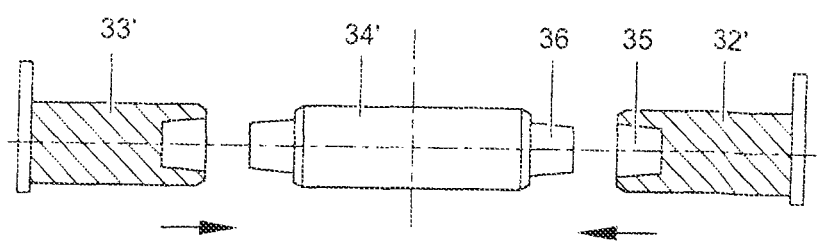

FIG. 4a) now shows a further exemplary embodiment of the present disclosure, which differs from the exemplary embodiment shown in FIG. 3 merely by the differently designed bolt.

In FIG. 4a) three bolt elements 32, 33 and 34 are used. The middle bolt element 34 supports on the bearing point 17 of the middle bearing plate 14. The two outer bolt elements 32 and 33 each are inserted into the bearing points 16, 18 of the outer bearing plates 13 and 15 from outside and secured at the same. Mounting the inner bolt element 34 can be effected in a floating manner, so that the same merely is secured via the outer bolt elements 32 and 33. Alternatively, however, securing the inner bolt element 34 at the bearing point 17 of the middle bearing plate 14 also is conceivable. In the embodiment shown in FIG. 4a) the end faces of the individual bolt elements abut against each other.

In FIG. 4b) a further design variant is shown, in which the end faces of the individual bolt elements are equipped with a positive connection which allows a centering and support of the bolt elements on each other.

In the exemplary embodiment, the middle bolt element 34' therefore each includes a protrusion 36 on its two end faces, which can be pushed into corresponding cutouts 35 on the end faces of the outer bolt elements 32' and 33'. The protrusions and cutouts in particular can be designed rotationally symmetrically to the axis of the bolts. In particular, the cutout and the protrusion each can be designed conically, in order to provide for easy centering.

A corresponding connection of the bolt elements is conceivable not only with a three-part bolt, but also in the design with two bolt elements 19 and 20 as shown in FIG. 3.

Due to the three-shear articulation of the boom and correspondingly the use of three main webs or bearing plates, the present disclosure provides for achieving the advantages of a four-shear bearing, without having to accept its disadvantages for the stability of the boom.

The invention claimed is:

1. An implement comprising a boom, wherein the boom is pivotally mounted about a horizontal axis via a bolt connection on a basic unit of the implement, wherein the boom is mounted on the basic unit via first, second, and third bearing plates, the second bearing plate being located between the first and third bearing plates, with corresponding bearing points for the bolt connection, wherein
the bolt connection is effected via two bolt elements which support on the second bearing plate with their inner ends.

2. The implement according to claim 1, wherein the bolt elements are connectable with each other via positive connections.

3. The implement according to claim 1, wherein a bearing point for articulating an energy recovery cylinder or a power actuator furthermore is provided on the second bearing plate, with this bearing point being arranged below a bearing point for articulating the boom, and/or wherein bearing points for articulating hydraulic cylinders for moving the boom are arranged on the first and/or third bearing plates.

4. The implement according to claim 1, wherein the three bearing plates extend upwards in a vertical direction from a support structure of the basic unit and/or are aligned parallel to each other.

5. The implement according to claim 1, wherein a boom foot of the boom is formed as a closed box construction, in which a cutout for accommodating the second bearing plate is formed.

6. The implement according to claim 1, wherein the implement is a construction, earth-moving and/or material-handling machine.

7. An implement, comprising:
a boom having first and second bushings;
a turntable rotatable about a vertical axis, wherein the boom is pivotally mounted about a horizontal axis via a bolt connection on the turntable via first, second, and third bearing plates, the second bearing plate being located between the first and third bearing plates, with corresponding bearing points for the bolt connection; and
at least two bolt sections forming the bolt connection, wherein the second bearing plate directly supports one of the bolt sections, that one bolt section directly interfacing with each of the first and second bushings, wherein
the bolt connection includes exactly two bolt sections which each are supported directly by the second bearing plate at their inner ends.

8. The implement according to claim 7, wherein the bolt sections are connected together via positive connections.

9. The implement according to claim 8, wherein a bearing point for articulating an energy recovery cylinder or a power actuator furthermore is provided on the second bearing plate, with this bearing point being arranged below a bearing point for articulating the boom.

10. The implement according to claim 8, wherein, bearing points for articulating hydraulic cylinders for moving the boom are arranged on the first and/or third bearing plates.

11. The implement according to claim 10, wherein the three bearing plates extend upwards in a vertical direction and are aligned parallel to each other.

12. The implement according to claim 7, wherein a boom foot of the boom is formed as a closed box construction, in which a cutout for accommodating the second bearing plate is formed.

13. The implement according to claim 7, wherein the implement is a construction, earth-moving and/or material-handling machine.

* * * * *